R. A. FESSENDEN.
METHOD FOR UTILIZING PULVERULENT MATTER AS FUEL.
APPLICATION FILED DEC. 26, 1911.
1,191,072. Patented July 11, 1916.
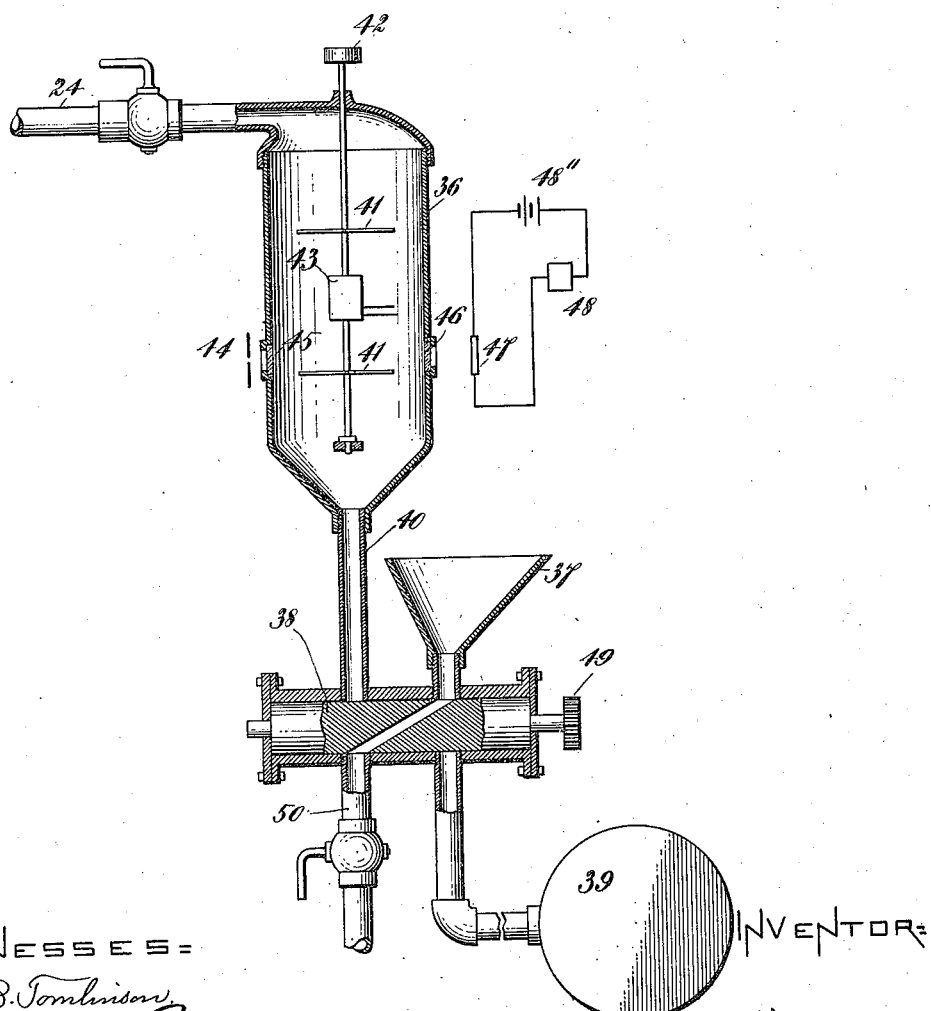

UNITED STATES PATENT OFFICE.

REGINALD A. FESSENDEN, OF BROOKLINE, MASSACHUSETTS.

METHOD FOR UTILIZING PULVERULENT MATTER AS FUEL.

1,191,072.

Specification of Letters Patent. Patented July 11, 1916.

Application filed December 26, 1911. Serial No. 667,844.

*To all whom it may concern:*

Be it known that I, REGINALD A. FESSENDEN, a citizen of the United States, and a resident of Brookline, in the county of Norfolk and State of Massachusetts, have invented a new and useful Improvement in Methods for Utilizing Pulverulent Matter as Fuel, of which the following is a specification.

My invention relates to methods for utilizing pulverulent matter as fuel.

The figure forming a part of this specification, shows apparatus and arrangements suitable for carrying out my invention.

The purpose of my invention is the more efficient production of combustion of pulverulent matter, and more especially in connection with internal combustion engines, and similar purposes.

In place of kerosene oil or gasolene or alcohol or hot tar or asphalt I may use pulverized solid fuel, such as powdered bituminous coal, or hard asphalt, or lignite, or chaff, or sawdust or peat. This has not hitherto been accomplished in internal combustion engines, on account of the difficulties in spreading the fuel, in preventing it from carbonizing and sticking together so as to prevent complete combustion, etc., and it has been usual, as recommended by Diesel, to produce gas from such substances as bituminous coal, without attempting to introduce them directly into the cylinder, on account of this coking and difficulty of spraying or distributing. I overcome this difficulty in several ways, some of which are quite satisfactory, but I prefer the following method, based upon my discovery that coal dust, if once suspended in sufficiently dense air, will remain suspended therein like mud in water, and can be treated thereafter as a hydrocarbon gas. The rate of falling of small particles is given by a formula which takes into account the relative densities of the dust and the medium, the temperature, viscosity, etc. A fine powder can therefore be caused to fall more slowly by varying these factors. Air for example at a pressure of 64 atmospheres has a density 64 times as great as when not compressed, *i. e.* about $\frac{1}{12}$ that of water. Powdered coal dust falls through this air very slowly, especially if fine and if the air is warm and dry. If the air so compressed is kept in motion the coal dust is to all practical purposes held in solution, and can be so treated. Even if the air is so warm as to effect a slight amount of coking, this is an advantage, as the evolved gas helps combustion, and I prefer to so adjust the heat. The apparatus for accomplishing this is shown in the drawing. Here 37 is a reservoir containing coal dust, and 38 a valve operated by the gear wheel 49. When the valve is in the position shown, the valve hole fills with dust. On rotating 38 the air from the compressed air tank 39 blows the dust into the chamber 36, incidentally stirring up the dust which may have fallen to the bottom of 36, or 40. Once in this chamber the dust remains in suspension, very evenly divided and falling very slowly. To aid in keeping the mixture uniform the rotating wheels or propellers 41. 41. are kept in rotation by the pulley 42, or electric motor 43. 24 is the pipe leading to the admission valve and engine chamber, and 50 is a pipe used for sucking in the coal dust into the valve hole or for cleaning the valve hole, the lower end of the pipe 50 being attached, for these purposes, to any suitable suction device, such as an exhaust fan.

I automatically regulate the mixture so as to keep it uniform, or to vary it in accordance with the load, in the following way. The arc lamp 44 throws a beam of light through the windows 45, 46, onto the selenium or thermopile cell 47, and produces an indication on the electromagnetic mechanism 48 contained in the circuit 47, 48, 48'', dependent upon the opacity of the air in the chamber 36. By setting the contact of the electromagnetic mechanism at any fixed point the density of the mixture will be maintained constant, by the shutting off or turning on of the motor driving the gear 49. Or by causing the contact of 48 to have a position dependent upon the load, the mixture will be varied with the load.

What I claim is:

1. The method of producing a mixture of pulverulent matter and gas, which consists in introducing, in a definite and predetermined ratio of matter to gas, the matter into a chamber containing compressed gas, maintaining the matter in said chamber in a state of suspension and in an unburned condition.

2. The method of producing a mixture of pulverulent matter and gas, which consists in introducing, in a definite and predetermined ratio of matter to gas, the matter into a chamber containing compressed gas, maintaining the matter in said chamber in a state of suspension and in an unburned condition, and heated to such a degree as to drive off volatile hydrocarbons from said matter.

3. The method of producing a mixture of pulverulent matter and gas, which consists in introducing, in a definite and predetermined ratio of matter to gas, the matter into a chamber containing compressed gas, maintaining said matter in said chamber in a state of suspension, and governing the amount of pulverulent matter introduced into said chamber by means of the variation in the amount of radiation passing through said chamber.

In testimony whereof, I have hereunto subscribed my name this 23d day of December, 1911.

REGINALD A. FESSENDEN.

Witnesses:
E. B. TOMLINSON,
ALAN WILKIE.